US010831984B2

United States Patent
Zhang et al.

(10) Patent No.: US 10,831,984 B2
(45) Date of Patent: *Nov. 10, 2020

(54) WEB PAGE DESIGN SNAPSHOT GENERATOR

(71) Applicant: INTERNATIONAL BUSINESS MACHINES CORPORATION, Armonk, NY (US)

(72) Inventors: Yan Zhang, Shanghai (CN); Xiang Zhou, Shanghai (CN)

(73) Assignee: International Business Machines Corporation, Armonk, NY (US)

( * ) Notice: Subject to any disclaimer, the term of this patent is extended or adjusted under 35 U.S.C. 154(b) by 0 days.

This patent is subject to a terminal disclaimer.

(21) Appl. No.: 16/371,227

(22) Filed: Apr. 1, 2019

(65) Prior Publication Data

US 2019/0228054 A1  Jul. 25, 2019

Related U.S. Application Data

(63) Continuation of application No. 15/415,004, filed on Jan. 25, 2017, now Pat. No. 10,360,288.

(51) Int. Cl.
*G06F 40/106* (2020.01)
*G06F 40/14* (2020.01)
(Continued)

(52) U.S. Cl.
CPC ............ *G06F 40/106* (2020.01); *G06F 40/14* (2020.01); *G06F 40/268* (2020.01); *G06F 40/30* (2020.01); *H04L 67/10* (2013.01)

(58) Field of Classification Search
CPC ...... G06F 40/106; G06F 40/268; G06F 40/30; G06F 40/14; H04L 67/10
See application file for complete search history.

(56) References Cited

U.S. PATENT DOCUMENTS 5,893,127 A  4/1999  Tyan et al.
8,151,186 B1  4/2012  Spasojevic
(Continued)

FOREIGN PATENT DOCUMENTS

WO  WO2013005218 A1  1/2013

OTHER PUBLICATIONS

Loo, Poh Kok, and Chew Lim Tan. "Word and sentence extraction using irregular pyramid." In International Workshop on Document Analysis Systems, pp. 307-318. Springer, Berlin, Heidelberg, 2002. (Year: 2002).*

(Continued)

*Primary Examiner* — Frank D Mills
(74) *Attorney, Agent, or Firm* — Patrick J. Daugherty; Daugherty & Del Zoppo Co., LPA

(57) ABSTRACT

Aspects provide multilevel design characterization of a web page via identifying different individual graphic element (text characters, images or graphical control elements) displayed within a web page layout, and determining linear groupings thereof (horizontal rows or vertical columns) as a function of differences in their positioning relative to each other. Aspects further identify clusters of the linear groupings and individual graphic elements as a function of clustering indicia (layout pattern indicia, gap level indicia or cluster group indicia), identify repetitive groupings of the clusters as unique list region collections, and determine a tree structure for the unique list region collections that identifies unique list region collections having more dominant element type, size, alignment, style or class name attribute values within the web page layout as root nodes, and others having less dominant element attribute values as child nodes relative to the root nodes.

14 Claims, 6 Drawing Sheets

(51) Int. Cl.
*G06F 40/30* (2020.01)
*G06F 40/268* (2020.01)
*H04L 29/08* (2006.01)

(56) References Cited

U.S. PATENT DOCUMENTS

| | | | |
|---|---|---|---|
| 8,151,187 B1 | 4/2012 | Spasojevic | |
| 8,291,313 B1* | 10/2012 | Monikandan | G06F 40/103 |
| | | | 715/244 |
| 10,360,288 B2* | 7/2019 | Zhang | G06F 40/30 |
| 2004/0216084 A1 | 10/2004 | Brown et al. | |
| 2013/0097488 A1 | 4/2013 | Coman et al. | |
| 2013/0117656 A1* | 5/2013 | Verlaan | G06F 40/186 |
| | | | 715/234 |
| 2014/0298156 A1 | 10/2014 | Liang | |
| 2015/0310122 A1 | 10/2015 | Hall | |
| 2016/0034441 A1* | 2/2016 | Nguyen | G06F 40/103 |
| | | | 715/234 |
| 2017/0199851 A1* | 7/2017 | Sasikumar | G06F 40/166 |
| 2018/0203674 A1* | 7/2018 | Dayanandan | G06F 8/38 |

OTHER PUBLICATIONS

Peter Mell et al, The NIST Definition of Cloud Computing, National Institute of Standards and Technology, Publication 800-145, 2011.

Jaspreet S. Ahuja, Perceived disorientation: An examination of a new measure to assess Web design effectiveness, Interacting with Computers, vol. 14, Issue 1, Dec. 2001.

Nguyen, Tuan Anh et al, "Reverse engineering mobile application user interface with REMAUI" in Automated Software Engineering (ASE), 2015, 30th IEEE/ACM International Conference on, pp. 248-259. IEEE, 2015 (Year: 2015).

Hasan Yassin My et al, "Morphological text extraction from Images", IEEE Transactions on Image Processing 9, No. 11, (2000); 1978-1983 (Year: 2000).

U.S. Appl. No. 15/415,004, filed Jan. 25, 2017, Confirmation No. 4206.

* cited by examiner

WEB PAGE DESIGN SNAPSHOT GENERATOR

BACKGROUND

A web page is a document file created for display on the World Wide Web and web browsers. A web browser displays a web page on a monitor or mobile device. The web page is what displays, but the term also refers to a computer file, usually written in hypertext mark-up language (HTML) or other mark-up language. Web browsers coordinate the various web resource elements for the written web page, such as style sheets, scripts, and images, to present the web page.

Cascading Style Sheets (CSS) is an example of a style sheet language standard used for describing the presentation of a document written in a markup language, often used to set the visual style of a web page and user interfaces. A style sheet specification describes a priority scheme to determine which style rules apply if more than one rule matches against a particular element. In this so-called cascade, priorities (or weights) are calculated and assigned to rules, so that the results are predictable. CSS, HTML and JavaScript™ are commonly used by web page designers to create visually engaging webpages, user interfaces for web applications, and user interfaces for many mobile applications. (JAVA and all JAVA-based trademarks and logos are trademarks or registered trademarks of Oracle and/or its affiliates.)

Style sheet specifications are designed primarily to enable the separation of document content from document presentation, including aspects such as the layout, colors, and fonts. This separation can improve content accessibility, provide more flexibility and control in the specification of presentation characteristics, enable multiple HTML pages to share formatting by specifying the relevant style sheet data in a separate file (for example, a ".css" file), and reduce complexity and repetition in the structural content.

Separation of formatting and content makes it possible to present the same markup page in different styles for different rendering methods, such as on-screen, in print, by voice (via speech-based browser or screen reader), and on Braille-based tactile devices. It can also generate the display of a web page differently depending on the screen size or viewing device. Readers can also specify a different style sheet, such as another style sheet file stored on their own computer, to override one specified by an author or designer of a web page.

BRIEF SUMMARY

In one aspect of the present invention, a computerized method for multilevel design characterization of a web page includes executing steps on a computer processor. Thus, a computer processor identifies different individual graphic element (text characters, images or graphical control elements) that are displayed within a web page layout, and determines linear groupings thereof (horizontal rows or vertical columns) as a function of differences in their positioning relative to each other. The processor further identifies clusters of the linear groupings and individual graphic elements as a function of clustering indicia (layout pattern indicia, gap level indicia or cluster group indicia), identifies repetitive groupings of the clusters as unique list region collections, and determines a tree structure for the unique list region collections that identifies unique list region collections having more dominant element type, size, alignment, style or class name attribute values within the web page layout as root nodes, and others having less dominant element attribute values as child nodes relative to the root nodes.

In another aspect, a system has a hardware processor in circuit communication with a computer readable memory and a computer-readable storage medium having program instructions stored thereon. The processor executes the program instructions stored on the computer-readable storage medium via the computer readable memory and thereby identifies different individual graphic element (text characters, images or graphical control elements) that are displayed within a web page layout, and determines linear groupings thereof (horizontal rows or vertical columns) as a function of differences in their positioning relative to each other. The processor further identifies clusters of the linear groupings and individual graphic elements as a function of clustering indicia (layout pattern indicia, gap level indicia or cluster group indicia), identifies repetitive groupings of the clusters as unique list region collections, and determines a tree structure for the unique list region collections that identifies unique list region collections having more dominant element type, size, alignment, style or class name attribute values within the web page layout as root nodes, and others having less dominant element attribute values as child nodes relative to the root nodes.

In another aspect, a computer program product for multilevel design characterization of a web page has a computer-readable storage medium with computer readable program code embodied therewith. The computer readable hardware medium is not a transitory signal per se. The computer readable program code includes instructions for execution which cause the processor to identify different individual graphic element (text characters, images or graphical control elements) that are displayed within a web page layout, and determines linear groupings thereof (horizontal rows or vertical columns) as a function of differences in their positioning relative to each other. The processor is further caused to identify clusters of the linear groupings and individual graphic elements as a function of clustering indicia (layout pattern indicia, gap level indicia or cluster group indicia), identify repetitive groupings of the clusters as unique list region collections, and determine a tree structure for the unique list region collections that identifies unique list region collections having more dominant element type, size, alignment, style or class name attribute values within the web page layout as root nodes, and others having less dominant element attribute values as child nodes relative to the root nodes.

BRIEF DESCRIPTION OF THE DRAWINGS

These and other features of embodiments of the present invention will be more readily understood from the following detailed description of the various aspects of the invention taken in conjunction with the accompanying drawings in which.

DETAILED DESCRIPTION

Figure 1:
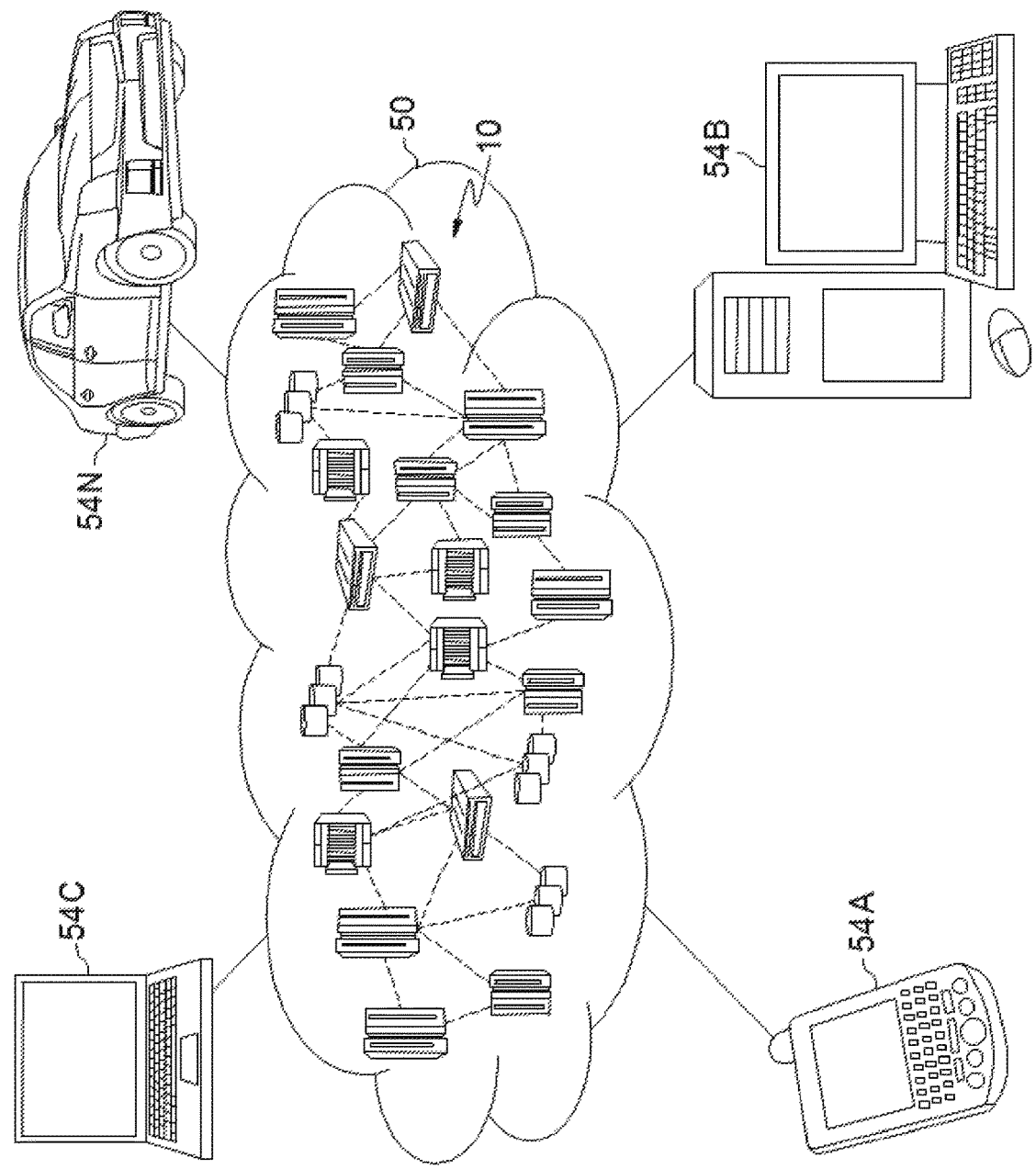
FIG. 1 depicts a cloud computing environment according to an embodiment of the present invention.

The present invention may be a system, a method, and/or a computer program product at any possible technical detail level of integration. The computer program product may include a computer readable storage medium (or media) having computer readable program instructions thereon for causing a processor to carry out aspects of the present invention.

The computer readable storage medium can be a tangible device that can retain and store instructions for use by an instruction execution device. The computer readable storage medium may be, for example, but is not limited to, an electronic storage device, a magnetic storage device, an optical storage device, an electromagnetic storage device, a semiconductor storage device, or any suitable combination of the foregoing. A non-exhaustive list of more specific examples of the computer readable storage medium includes the following: a portable computer diskette, a hard disk, a random access memory (RAM), a read-only memory (ROM), an erasable programmable read-only memory (EPROM or Flash memory), a static random access memory (SRAM), a portable compact disc read-only memory (CD-ROM), a digital versatile disk (DVD), a memory stick, a floppy disk, a mechanically encoded device such as punchcards or raised structures in a groove having instructions recorded thereon, and any suitable combination of the foregoing. A computer readable storage medium, as used herein, is not to be construed as being transitory signals per se, such as radio waves or other freely propagating electromagnetic waves, electromagnetic waves propagating through a waveguide or other transmission media (e.g., light pulses passing through a fiber-optic cable), or electrical signals transmitted through a wire.

Computer readable program instructions described herein can be downloaded to respective computing/processing devices from a computer readable storage medium or to an external computer or external storage device via a network, for example, the Internet, a local area network, a wide area network and/or a wireless network. The network may comprise copper transmission cables, optical transmission fibers, wireless transmission, routers, firewalls, switches, gateway computers and/or edge servers. A network adapter card or network interface in each computing/processing device receives computer readable program instructions from the network and forwards the computer readable program instructions for storage in a computer readable storage medium within the respective computing/processing device.

Computer readable program instructions for carrying out operations of the present invention may be assembler instructions, instruction-set-architecture (ISA) instructions, machine instructions, machine dependent instructions, microcode, firmware instructions, state-setting data, configuration data for integrated circuitry, or either source code or object code written in any combination of one or more programming languages, including an object oriented programming language such as Smalltalk, C++, or the like, and procedural programming languages, such as the "C" programming language or similar programming languages. The computer readable program instructions may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider). In some embodiments, electronic circuitry including, for example, programmable logic circuitry, field-programmable gate arrays (FPGA), or programmable logic arrays (PLA) may execute the computer readable program instructions by utilizing state information of the computer readable program instructions to personalize the electronic circuitry, in order to perform aspects of the present invention.

Aspects of the present invention are described herein with reference to flowchart illustrations and/or block diagrams of methods, apparatus (systems), and computer program products according to embodiments of the invention. It will be understood that each block of the flowchart illustrations and/or block diagrams, and combinations of blocks in the flowchart illustrations and/or block diagrams, can be implemented by computer readable program instructions.

These computer readable program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks. These computer readable program instructions may also be stored in a computer readable storage medium that can direct a computer, a programmable data processing apparatus, and/or other devices to function in a particular manner, such that the computer readable storage medium having instructions stored therein comprises an article of manufacture including instructions which implement aspects of the function/act specified in the flowchart and/or block diagram block or blocks.

The computer readable program instructions may also be loaded onto a computer, other programmable data processing apparatus, or other device to cause a series of operational steps to be performed on the computer, other programmable apparatus or other device to produce a computer implemented process, such that the instructions which execute on the computer, other programmable apparatus, or other device implement the functions/acts specified in the flowchart and/or block diagram block or blocks.

The flowchart and block diagrams in the Figures illustrate the architecture, functionality, and operation of possible implementations of systems, methods, and computer program products according to various embodiments of the present invention. In this regard, each block in the flowchart or block diagrams may represent a module, segment, or portion of instructions, which comprises one or more executable instructions for implementing the specified logical function(s). In some alternative implementations, the functions noted in the block may occur out of the order noted in the figures. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts or carry out combinations of special purpose hardware and computer instructions.

It is understood in advance that although this disclosure includes a detailed description on cloud computing, implementation of the teachings recited herein are not limited to a cloud computing environment. Rather, embodiments of the present invention are capable of being implemented in conjunction with any other type of computing environment now known or later developed.

Cloud computing is a model of service delivery for enabling convenient, on-demand network access to a shared pool of configurable computing resources (e.g. networks, network bandwidth, servers, processing, memory, storage, applications, virtual machines, and services) that can be rapidly provisioned and released with minimal management effort or interaction with a provider of the service. This cloud model may include at least five characteristics, at least three service models, and at least four deployment models.

Characteristics are as follows:

On-demand self-service: a cloud consumer can unilaterally provision computing capabilities, such as server time and network storage, as needed automatically without requiring human interaction with the service's provider.

Broad network access: capabilities are available over a network and accessed through standard mechanisms that promote use by heterogeneous thin or thick client platforms (e.g., mobile phones, laptops, and PDAs).

Resource pooling: the provider's computing resources are pooled to serve multiple consumers using a multi-tenant model, with different physical and virtual resources dynamically assigned and reassigned according to demand. There is a sense of location independence in that the consumer generally has no control or knowledge over the exact location of the provided resources but may be able to specify location at a higher level of abstraction (e.g., country, state, or datacenter).

Rapid elasticity: capabilities can be rapidly and elastically provisioned, in some cases automatically, to quickly scale out and rapidly released to quickly scale in. To the consumer, the capabilities available for provisioning often appear to be unlimited and can be purchased in any quantity at any time.

Measured service: cloud systems automatically control and optimize resource use by leveraging a metering capability at some level of abstraction appropriate to the type of service (e.g., storage, processing, bandwidth, and active user accounts). Resource usage can be monitored, controlled, and reported providing transparency for both the provider and consumer of the utilized service.

Service Models are as follows:

Software as a Service (SaaS): the capability provided to the consumer is to use the provider's applications running on a cloud infrastructure. The applications are accessible from various client devices through a thin client interface such as a web browser (e.g., web-based e-mail). The consumer does not manage or control the underlying cloud infrastructure including network, servers, operating systems, storage, or even individual application capabilities, with the possible exception of limited user-specific application configuration settings.

Platform as a Service (PaaS): the capability provided to the consumer is to deploy onto the cloud infrastructure consumer-created or acquired applications created using programming languages and tools supported by the provider. The consumer does not manage or control the underlying cloud infrastructure including networks, servers, operating systems, or storage, but has control over the deployed applications and possibly application hosting environment configurations.

Infrastructure as a Service (IaaS): the capability provided to the consumer is to provision processing, storage, networks, and other fundamental computing resources where the consumer is able to deploy and run arbitrary software, which can include operating systems and applications. The consumer does not manage or control the underlying cloud infrastructure but has control over operating systems, storage, deployed applications, and possibly limited control of select networking components (e.g., host firewalls).

Deployment Models are as follows:

Private cloud: the cloud infrastructure is operated solely for an organization. It may be managed by the organization or a third party and may exist on-premises or off-premises.

Community cloud: the cloud infrastructure is shared by several organizations and supports a specific community that has shared concerns (e.g., mission, security requirements, policy, and compliance considerations). It may be managed by the organizations or a third party and may exist on-premises or off-premises.

Public cloud: the cloud infrastructure is made available to the general public or a large industry group and is owned by an organization selling cloud services.

Hybrid cloud: the cloud infrastructure is a composition of two or more clouds (private, community, or public) that remain unique entities but are bound together by standardized or proprietary technology that enables data and application portability (e.g., cloud bursting for load-balancing between clouds).

A cloud computing environment is service oriented with a focus on statelessness, low coupling, modularity, and semantic interoperability. At the heart of cloud computing is an infrastructure comprising a network of interconnected nodes.

Referring now to FIG. 1, illustrative cloud computing environment 50 is depicted. As shown, cloud computing environment 50 comprises one or more cloud computing nodes 10 with which local computing devices used by cloud consumers, such as, for example, personal digital assistant (PDA) or cellular telephone 54A, desktop computer 54B, laptop computer 54C, and/or automobile computer system 54N may communicate. Nodes 10 may communicate with one another. They may be grouped (not shown) physically or virtually, in one or more networks, such as Private, Community, Public, or Hybrid clouds as described hereinabove, or a combination thereof. This allows cloud computing environment 50 to offer infrastructure, platforms and/or software as services for which a cloud consumer does not need to maintain resources on a local computing device. It is understood that the types of computing devices 54A-N shown in FIG. 1 are intended to be illustrative only and that computing nodes 10 and cloud computing environment 50 can communicate with any type of computerized device over any type of network and/or network addressable connection (e.g., using a web browser).

Figure 2:
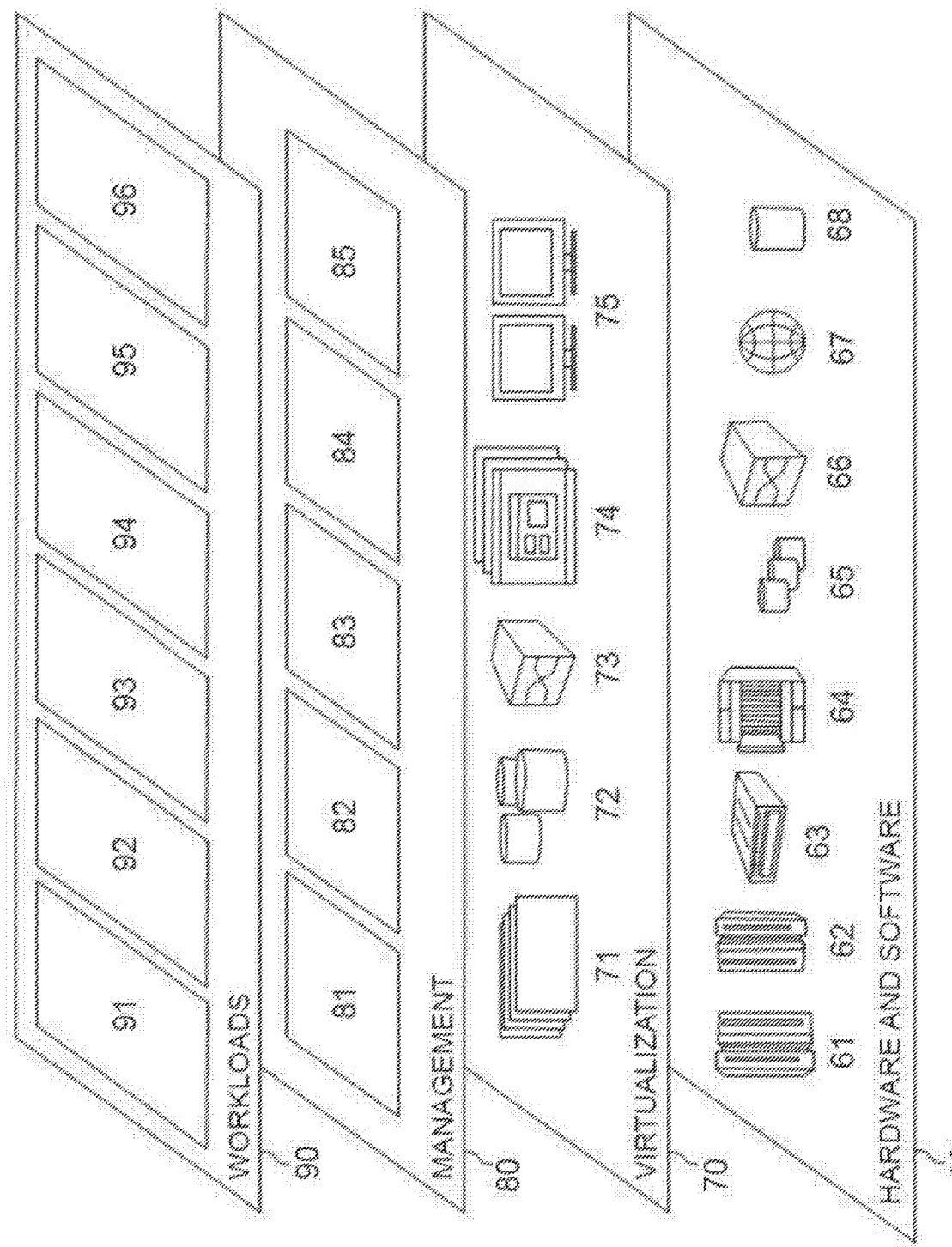
FIG. 2 depicts a cloud computing node according to an embodiment of the present invention.

Referring now to FIG. 2, a set of functional abstraction layers provided by cloud computing environment 50 (FIG. 1) is shown. It should be understood in advance that the components, layers, and functions shown in FIG. 2 are intended to be illustrative only and embodiments of the invention are not limited thereto. As depicted, the following layers and corresponding functions are provided:

Hardware and software layer 60 includes hardware and software components. Examples of hardware components include: mainframes 61; RISC (Reduced Instruction Set Computer) architecture based servers 62; servers 63; blade servers 64; storage devices 65; and networks and networking components 66. In some embodiments, software components include network application server software 67 and database software 68.

Virtualization layer 70 provides an abstraction layer from which the following examples of virtual entities may be provided: virtual servers 71; virtual storage 72; virtual networks 73, including virtual private networks; virtual applications and operating systems 74; and virtual clients 75.

In one example, management layer 80 may provide the functions described below. Resource provisioning 81 provides dynamic procurement of computing resources and other resources that are utilized to perform tasks within the cloud computing environment. Metering and Pricing 82 provide cost tracking as resources are utilized within the cloud computing environment, and billing or invoicing for consumption of these resources. In one example, these resources may comprise application software licenses. Security provides identity verification for cloud consumers and tasks, as well as protection for data and other resources. User portal 83 provides access to the cloud computing environment for consumers and system administrators. Service level management 84 provides cloud computing resource allocation and management such that required service levels are met. Service Level Agreement (SLA) planning and fulfillment 85 provide pre-arrangement for, and procurement of, cloud computing resources for which a future requirement is anticipated in accordance with an SLA.

Figure 4:
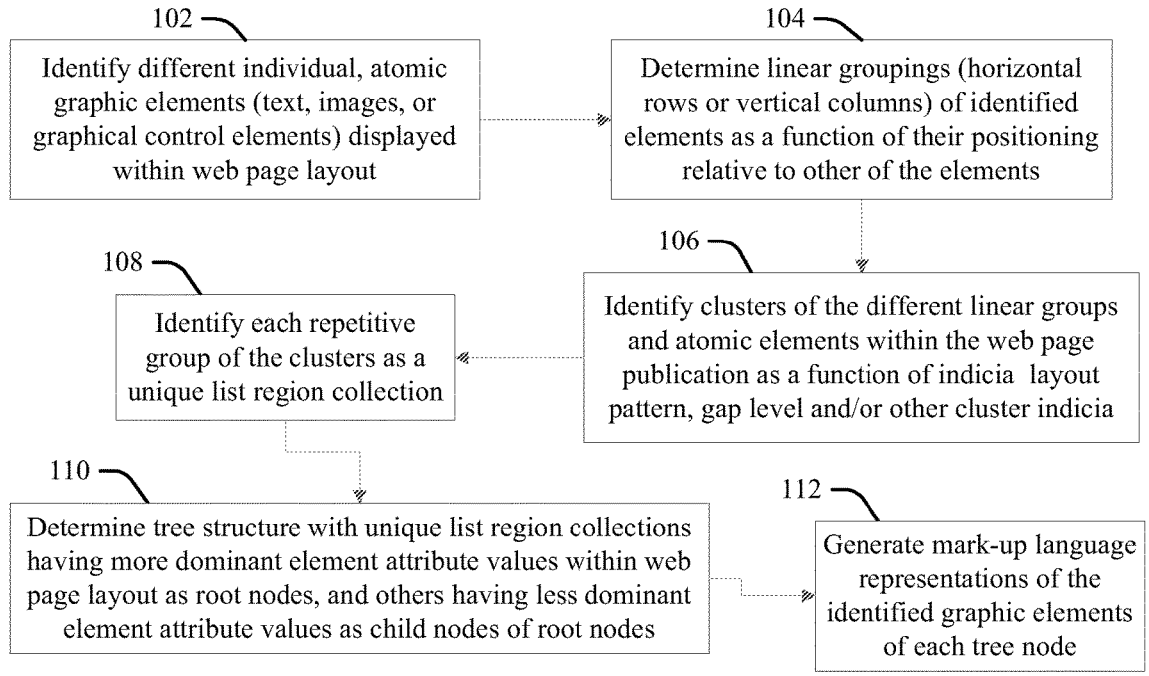
FIG. 4 is a flow chart illustration of a process or system according to an embodiment of the present invention.

Workloads layer 90 provides examples of functionality for which the cloud computing environment may be utilized. Examples of workloads and functions which may be provided from this layer include: mapping and navigation 91; software development and lifecycle management 92; virtual classroom education delivery 93; data analytics processing 94; transaction processing 95; and processing 96 for optimizing reference cache maintenance in a serialization system according to embodiments of the present invention, for example to execute the process steps or system components or tasks as depicted in FIG. 4 below.

Figure 3:
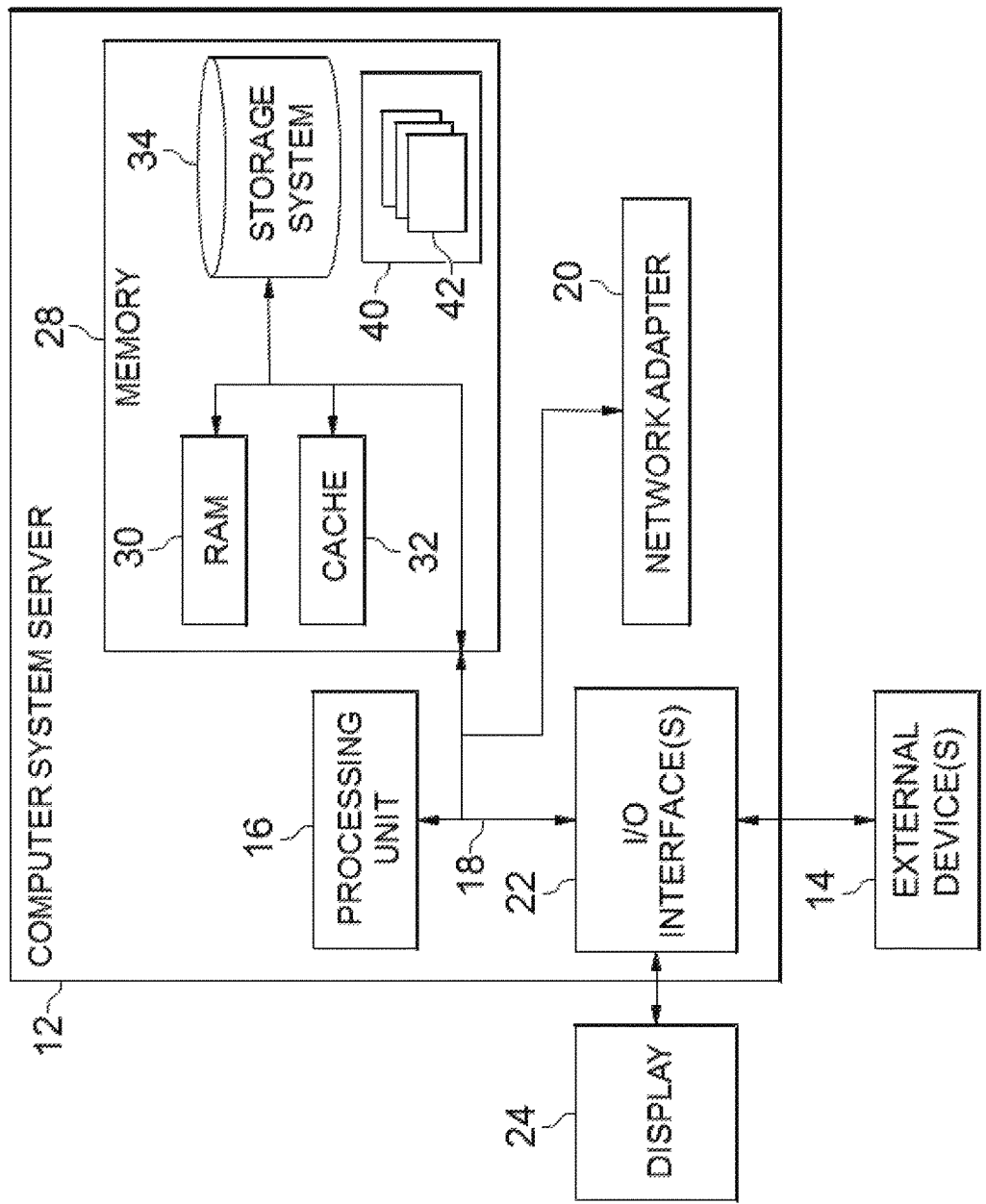
FIG. 3 depicts a computerized aspect according to an embodiment of the present invention.

FIG. 3 is a schematic of an example of a programmable device implementation 10 according to an aspect of the present invention, which may function as a cloud computing node within the cloud computing environment of FIG. 2. Programmable device implementation 10 is only one example of a suitable implementation and is not intended to suggest any limitation as to the scope of use or functionality of embodiments of the invention described herein. Regardless, programmable device implementation 10 is capable of being implemented and/or performing any of the functionality set forth hereinabove.

A computer system/server 12 is operational with numerous other general purpose or special purpose computing system environments or configurations. Examples of well-known computing systems, environments, and/or configurations that may be suitable for use with computer system/server 12 include, but are not limited to, personal computer systems, server computer systems, thin clients, thick clients, hand-held or laptop devices, multiprocessor systems, microprocessor-based systems, set top boxes, programmable consumer electronics, network PCs, minicomputer systems, mainframe computer systems, and distributed cloud computing environments that include any of the above systems or devices, and the like.

Computer system/server 12 may be described in the general context of computer system-executable instructions, such as program modules, being executed by a computer system. Generally, program modules may include routines, programs, objects, components, logic, data structures, and so on that perform particular tasks or implement particular abstract data types. Computer system/server 12 may be practiced in distributed cloud computing environments where tasks are performed by remote processing devices that are linked through a communications network. In a distributed cloud computing environment, program modules may be located in both local and remote computer system storage media including memory storage devices.

The computer system/server 12 is shown in the form of a general-purpose computing device. The components of computer system/server 12 may include, but are not limited to, one or more processors or processing units 16, a system memory 28, and a bus 18 that couples various system components including system memory 28 to processor 16.

Bus 18 represents one or more of any of several types of bus structures, including a memory bus or memory controller, a peripheral bus, an accelerated graphics port, and a processor or local bus using any of a variety of bus architectures. By way of example, and not limitation, such architectures include Industry Standard Architecture (ISA) bus, Micro Channel Architecture (MCA) bus, Enhanced ISA (EISA) bus, Video Electronics Standards Association (VESA) local bus, and Peripheral Component Interconnects (PCI) bus.

Computer system/server 12 typically includes a variety of computer system readable media. Such media may be any available media that is accessible by computer system/server 12, and it includes both volatile and non-volatile media, removable and non-removable media.

System memory 28 can include computer system readable media in the form of volatile memory, such as random access memory (RAM) 30 and/or cache memory 32. Computer system/server 12 may further include other removable/non-removable, volatile/non-volatile computer system storage media. By way of example only, storage system 34 can be provided for reading from and writing to a non-removable, non-volatile magnetic media (not shown and typically called a "hard drive"). Although not shown, a magnetic disk drive for reading from and writing to a removable, non-volatile magnetic disk (e.g., a "floppy disk"), and an optical disk drive for reading from or writing to a removable, non-volatile optical disk such as a CD-ROM, DVD-ROM or other optical media can be provided. In such instances, each can be connected to bus 18 by one or more data media interfaces. As will be further depicted and described below, memory 28 may include at least one program product having a set (e.g., at least one) of program modules that are configured to carry out the functions of embodiments of the invention.

Program/utility 40, having a set (at least one) of program modules 42, may be stored in memory 28 by way of example, and not limitation, as well as an operating system, one or more application programs, other program modules, and program data. Each of the operating system, one or more application programs, other program modules, and program data or some combination thereof, may include an implementation of a networking environment. Program modules 42 generally carry out the functions and/or methodologies of embodiments of the invention as described herein.

Computer system/server 12 may also communicate with one or more external devices 14 such as a keyboard, a pointing device, a display 24, etc.; one or more devices that enable a user to interact with computer system/server 12; and/or any devices (e.g., network card, modem, etc.) that enable computer system/server 12 to communicate with one or more other computing devices. Such communication can occur via Input/Output (I/O) interfaces 22. Still yet, computer system/server 12 can communicate with one or more networks such as a local area network (LAN), a general wide area network (WAN), and/or a public network (e.g., the Internet) via network adapter 20. As depicted, network adapter 20 communicates with the other components of computer system/server 12 via bus 18. It should be understood that although not shown, other hardware and/or software components could be used in conjunction with computer system/server 12. Examples, include, but are not limited to: microcode, device drivers, redundant processing units, external disk drive arrays, RAID systems, tape drives, and data archival storage systems, etc.

FIG. 4 illustrates a process or system according to the present invention for multilevel design characterization of a web page construction. At 102 a processor that is configured by executing program codes instructions according to the present invention (the configured processor) identifies a plurality of different individual, atomic graphic elements displayed within a web page layout that are selected from the group consisting of text characters, images, and graphical control elements (radio buttons, checkboxes, drop down menu initialization scripts, or other widgets or controls).

At 104 the configured processor determines linear groupings (horizontal rows or vertical columns) of the identified elements as a function of their positioning relative to each other ("row/column groups"). For example, rows forming sentences word groupings are identified as spaced vertically from other rows of words, or text words located within a threshold proximity to (or relatively more proximate to) a radio button as identified as descriptive text words associated with the radio button relative to other text words that are less proximate to the button, etc.

At 106 the configured processor identifies clusters (regions, groupings, etc.) of the different row/column level groups and the atomic elements within the web page publication as a function of indicia that may include layout pattern, gap level and/or other cluster indicia and analysis.

At 108 the configured processor identifies each repeated group of clusters as unique list region collections.

At 110 the configured processor determines a tree structure for the unique list region collections that identifies ones of unique list region collections having more dominant identified element attribute values within the web page layout as root nodes, and other ones of the unique list region collections having less dominant identified element attribute values within the web page layout as child nodes relative to the root nodes. Said attribute values are one or more of element type, element size, element alignment, element style and element class name attributes.

At 112 the configured processor generates mark-up language representations of the identified graphic elements of each tree node. Markup language is generally used to label parts of the web page document rather than to provide specific instructions as to how they should be processed. A variety of mark-up language representations may be generated, and illustrative but not limiting or exhaustive examples include Lamport TeX (LaTeX), a document preparation system language; HyperText Markup Language (HTML), a standard markup language for creating web pages and web applications; Extensible Markup Language (XML), a markup language that defines a set of rules for encoding documents in a format that is both human-readable and machine-readable; and still other appropriate mark-up languages will be known to one skilled in the art.

Figure 5:
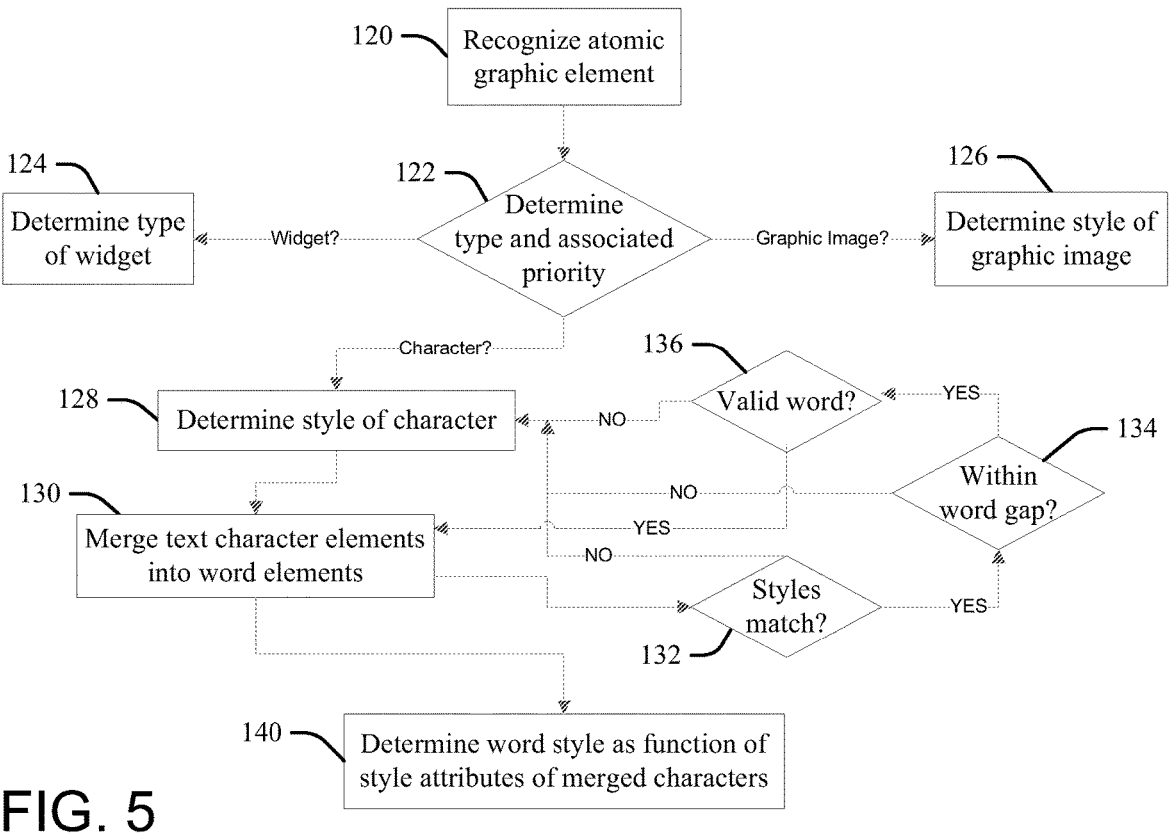
FIG. 5 is a flow chart illustration of a process or system according to another embodiment of the present invention.

FIG. 5 illustrates an aspect of the present invention that prioritizes the identification of different individual, atomic graphic elements within web page layout (for example at step 102 of FIG. 4) as a function of graphic element type. In response to recognition of an individual graphic on a web page at 120, at 122 a processor that is configured by executing program codes instructions according to the present invention (the configured processor) determines a type of the identified element and assigns an associated priority ranking, wherein "n" types of elements are allocated "n" different priority values. In the example illustrated in FIG. 5 a highest priority ("priority 1") is assigned to HTML graphical control elements (widgets), a next highest priority ("priority 2") is assigned to text characters, and a lowest priority ("priority 3") is assigned to image elements; other examples will categorize and prioritize more or less numbers of different atomic element types.

In response to identifying the element as a priority 1 widget, at 124 the configured processor determines the type of widget (as radio button, checkbox, drop down menu initialization script, etc.), in one example by selecting a closest matching one of a library (database) of known examples and styles via HTML code comparison.

In response to identifying and prioritizing the element as a priority 3 graphic image element, at 126 the configured processor determines a style of the graphic image element, for example a set of colors or tones, or line patterns etc.; transparency, or shadow percentage or other values, in one example selecting a closest matching one of a library (database) of known styles via HTML code comparison.

In response to identifying and prioritizing the element as a priority 2 text character, at 128 the configured processor determines style attributes for the character, via matching to a font type or family (Helvetica Neue, Times New Roman, or Arial, etc.), weight (normal or bold, etc.), style (normal, italic, or underlined, etc.) size (12 or other point size), color (gray, black or red, etc.), and still other character attributes may be considered, determined and matched.

In response to determining (matching) the character style attributes, at 130 the configured processor merges, combines or otherwise identifies groupings of individual identified text character elements as words or word element groupings. For example, the single character "I" may be identified as a pronoun word.

Merging determinations at 130 are made through a variety of processes. In the example of FIG. 5 the configured processor first identifies matching candidates at 132 as those sharing a same text character style (font family, weight, style, size, color, etc.), wherein failure to match styles eliminates a candidate from a current potential word grouping. At 134 the configured processor groups or excludes candidate characters (those sharing same style attributes) based on spacing and relative location from other candidate characters: for example, merging candidates into a word group if within a word group threshold gap distance to another character that indicates that they are both within a same word group of characters, or excluding them if they are spaced by at least a word separation threshold gap distance to the other candidate character, thereby indicating that that they are not both within a same word group of characters. At 136 the configured processor word validates sequential groupings of text characters as words by a word morphology analysis: for example, determining whether they match character groups of known words, follow capitalization and/or hyphenation rules for compound or possessive words or proper names; are within a common gap distance to other characters, wherein at least one is near enough to a widget to be associated to the widget as a widget label; and still other analyses will be apparent to one skilled in the art.

At 128 the configured processor reassesses characters not grouped at 132, 134 and 136 for character style, or confirmed as identified as single-character words or labels at 130.

At 140 the configured processor identifies overall or composite word styles for the word groupings, for example as common or dominant values of font family, weight, style, size, color, etc., attributes.

Figure 6:
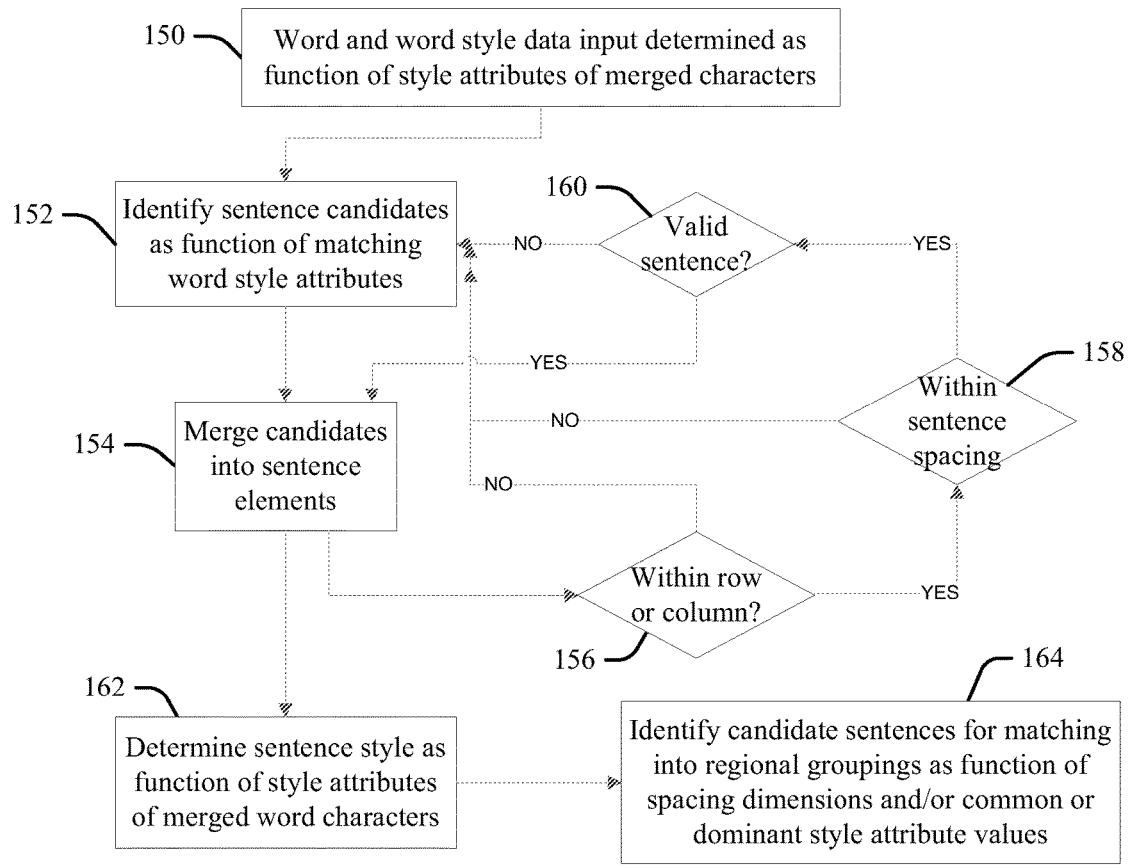
FIG. 6 is a flow chart illustration of a process or system according to another embodiment of the present invention.

FIG. 6 illustrates an aspect of the present invention that determines linear groupings (horizontal rows or vertical columns) of identified graphic elements (for example at step 104 of FIG. 4) as a function of graphic element type (word, widget or image element) and their positioning relative to others of the elements within web page layout. In the present example, the process is triggered in response to an input at 150 of word grouping data, such as data exported from step 140 of FIG. 5. Thus, at 152 a processor that is configured by executing program codes instructions according to the present invention (the configured processor) identifies other words as potential candidates for forming a sentence with one of the word elements as function of matching word style attributes, for example as matching a minimum or threshold number of font type/family, weight, style, size, color, etc. word attributes. Some word style attributes may be given differential weight or importance in matching determinations at 152, for example identifying sentence candidates that match font type/family, and weight, even if one or more of style, size or color vary.

At 154, the configured processor merges or combines individual sentence candidates into sentence element groupings. Sentence merging determinations at 154 are made through a variety of processes. In the present example, the configured processor identifies pluralities of matching sentence candidates at 156 as those within a common linear column or row arrangement, wherein failure to align within a row or column eliminates a word candidate from a current potential sentence word grouping.

At 158 the configured processor confirms candidate words as within the row or column groupings, or excludes, based on meeting sentence spacing standards relative to the other word candidates. For example, they are merged into a sentence group if within a sentence group threshold gap distance to another word that indicates that they are both within a same sentence, phrase or paragraph of words, or excluded if they are spaced by at least a sentence separation threshold gap distance to the other candidate words, thereby indicating that that they are not both within a same sentence of columnar paragraph grouping of words.

At 160 the configured processor validates sentence word groupings via semantic and/or syntactic analysis. For example, determining whether a group of words form a meaningful or legal sentence as a function of syntax rules (whether it has noun and verb and subject words); whether they follow capitalization and punctuation rules (are capitalized after a period, etc.); and still other analyses will be apparent to one skilled in the art.

At 152 the configured processor reassesses words not grouped into sentences at 156, 158 and 160 for matching candidate grouping character style, and identifies single, isolated words as titles, widget labels or as other non-sentence grouping words at 154.

At 162 the configured processor identifies overall or composite sentence styles for the sentence groupings, for example as common or dominant values of font family, weight, style, size, color, etc., attributes.

At 164 the configured processor identifies candidate sentences for matching into regional groupings as a function of spacing dimensions and/or common or dominant values of font family, weight, style, size, color, etc., attributes determined at 162. Thus, potential, discrete regional groupings of the merged sentences are identified as a function of spacing on the web page, for example in response to determining that they are close enough to each other to form a paragraph as a function of their internal word spacing, particularly if they share a common word spacing; and further that they share a common appearance style (one or more of font type/family, weight, style, size, color, etc., attributes).

Figure 7:
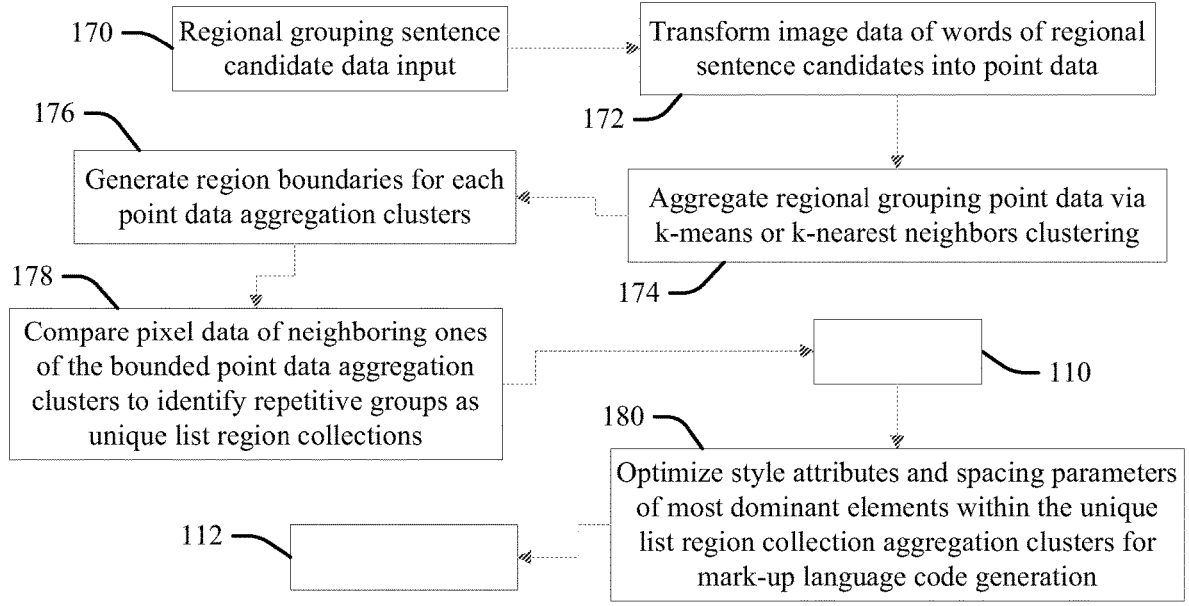
FIG. 7 is a flow chart illustration of a process or system according to another embodiment of the present invention.

FIG. 7 illustrates an aspect of the present invention that determines tree structure with list region collection root and child nodes as a function of cluster analysis, for example as performed by steps 106, 108 and 110 of FIG. 4. In the present example, the process is triggered in response to an input at 170 of regional grouping sentence candidate data, such as data exported from step 164 of FIG. 6.

At 172 a processor that is configured by executing program code instructions according to the present invention (the configured processor) transforms pixel or other image data of words of regional groupings (clusters) of the sentence candidates into point data, including by blurring edges and scattering linear row and column grouping data into point data.

At 174 the configured processor aggregates the regional grouping point data via "k-means" or "k-nearest neighbors" ("k-nn") clustering. Aspects that use k-means clustering partition n observations into k clusters in which each observation belongs to the cluster with the nearest mean. This results in a partitioning of the data space into Voronoi cells, a partitioning of a plane into regions based on distance to points in a specific subset of the plane.

K-nn clustering is a non-parametric classification and regression method. Aspects of the configured processor that use k-nn clustering identify and process an input of k closest training examples in a feature space to generated classification or regression outputs. The classification output comprising a class membership, wherein an object is classified by a majority vote of its neighbors, with the object being assigned to the class most common among its k nearest neighbors (where k is a positive integer): for example, in response to determining that the value of k is one for a given object, the configured processor assigns the object to the class of a single nearest neighbor. The k-nn regression output comprises a property value for an object determined as the average of the values of its k nearest neighbors. The configured processor may assign weights to contributions of neighbors, so that the nearer neighbors contribute more to average values than more distant ones. In one example the configured processor gives each neighbor a weight of 1/d, where d is a distance to the neighbor.

At 176 the configured processor generates region boundaries for each of the point data aggregation clusters, with respect to others of the point data aggregation clusters.

At 178 the configured processor compares the structured image pixel data of neighboring ones of the bounded point data aggregation clusters to identify repetitive groups as unique list region collections (see 108 of FIG. 4).

Next, the configured processor performs step 110 (as discussed above with respect to FIG. 4), thereby determining a tree structure with the unique list region collections having more dominant element attribute (type, size, alignment, style and/or class name) or highest prioritized values within the web page layout as root nodes, and others having less dominant or less prioritized element attribute values as child nodes of root nodes.

At 180 the configured processor optimizes the style attributes and spacing parameters (relative to other elements) of the most dominant elements within the unique list region collection aggregation clusters for mark-up language code generation, for use in generating mark-up language representations of the identified graphic elements of each tree node at 112 (FIG. 4) as a function of the optimized parameters.

Figure 8:
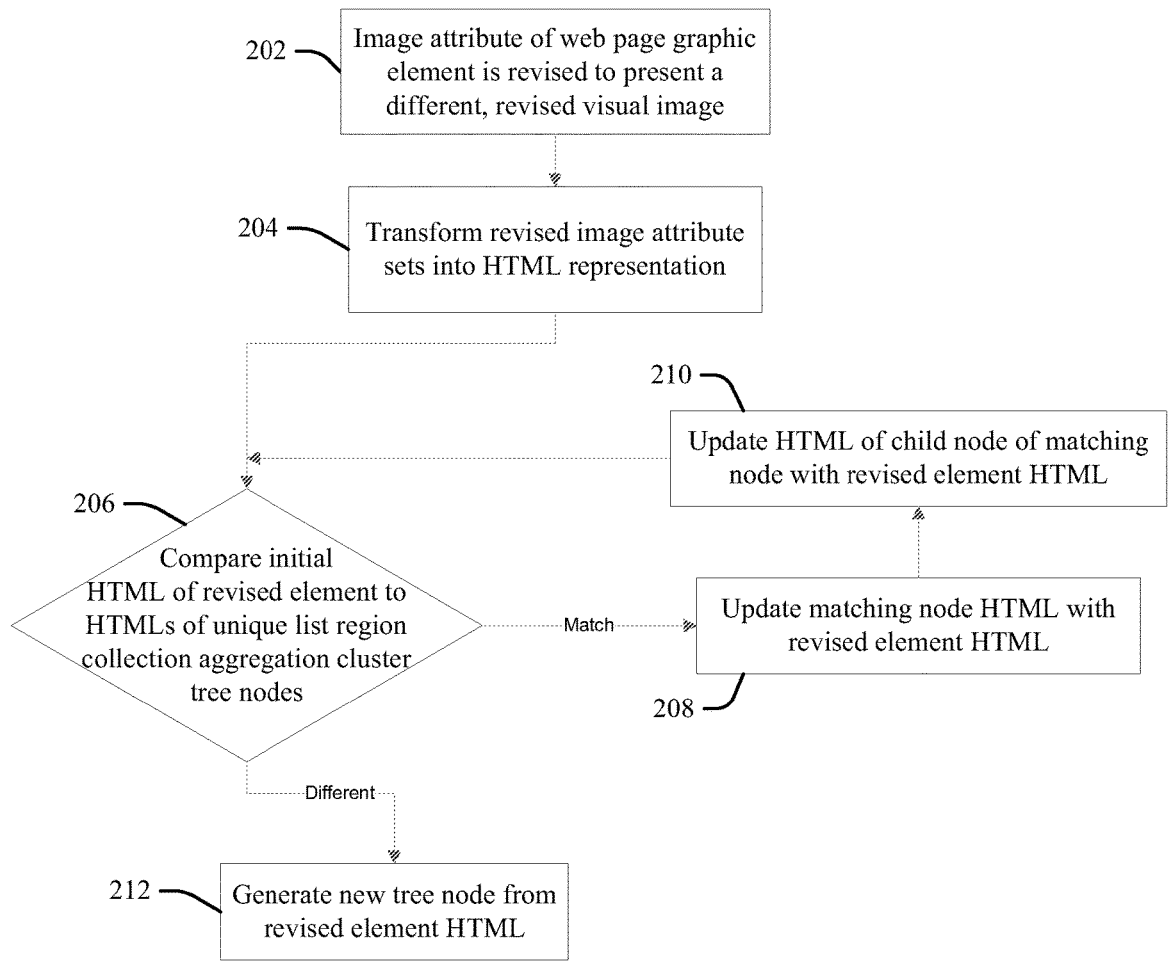
FIG. 8 is a flow chart illustration of a process or system according to another embodiment of the present invention.

FIG. 8 illustrates an embodiment of the present invention that uses the tree structure generated in FIG. 4 (and/or via the processes of FIG. 5, 6 or 7) to update atomic image elements on a web page. At 202 a graphic element of the web page that is configured to present an initial visual image defined by an initial set of image attributes is revised to present a different, revised visual image defined by a revised set of image attributes, wherein at least one of the attributes differs between the initial and revised sets and thereby presents an updated attribute value.

At 204 a processor that is configured by executing program code instructions according to the present invention (the configured processor) transforms the initial and revised image attribute sets into respective HTML representations, and at 206 compares them to HTML representations of unique list region collection aggregation cluster tree nodes root tree nodes generated for the page according to the present invention (for example, as generated at step 112 of FIG. 4).

In response to matching the HTML representation of the initial version of the revised image to the HTML representation of one of the tree nodes at 206, at 208 the configured processor updates or revises the HTML of the matching node with the HTML representation of the revisions to the image element. At 210 the configured processor further updates or revises the HTML of any child nodes of the matching node with the HTML representation of the revisions to the image element.

In response to failing to match the HTML representation of the initial version of the revised image to the HTML representations of any of the tree nodes at 206, at 212 the configured processor generates a new node within the unique list region collection aggregation cluster tree to represent the revised image element, for example via the process at 110 of FIG. 4.

Aspects of the present invention provide advantages in enabling designers and web page developers to work together to achieve a user interface (UI) requirement. Often a designer will create an overall design for a web page image, and a developer will refer to the design to implement mark-up language representation of elements within the design. However, such web page designs are generally in the form of a single image, while the web page is constructed with a plurality of different elements, requiring large expenditures for developer time under prior art techniques to adjust the HTML to meet the overall design, sometimes via a pixel level matching process.

In contrast, aspects of the present invention use image recognition processes spanning from a basic, atomic element level to a regional level, to define organizing tree nodes with merging steps. By comparing structured image pixel data of atomic elements to neighbors for similarities, repeated items are identified and summarized within regional list collections, wherein parameter optimization for code generation focuses on dominant element type, size, alignment, style, class name or other attributes. Aspects enable machine learning from previous recognition results and developer modifications on generated code to make more accurate element, line and region matching determinations, on a more time efficient basis relative to the prior art, as a function of defining a tree structure of dominant clusters (those most frequently repeated or appearing, displayed larger or otherwise more predominantly displayed) of repetitive clusters via comparing determined row/column level organizational groupings and individual elements displayed within each of the dominant regions.

Generated revision code is rendered in a browser the same as the design image, with all the text and images in the desired position. Aspects provide for a high degree of accuracy, especially in case of following a known design standard. Quick working web page response is achieved for comparatively frequent changes in design. For the senior developer, aspects provide a useful starting reference for re-structuring code according to personal preference, and changed structures may be fed back to design systems as training material. For junior developers, aspects provide a nearly-perfect working HTML structure.

The terminology used herein is for describing particular aspects only and is not intended to be limiting of the invention. As used herein, the singular forms "a", "an" and "the" are intended to include the plural forms as well, unless the context clearly indicates otherwise. It will be further understood that the terms "include" and "including" when used in this specification specify the presence of stated features, integers, steps, operations, elements, and/or components, but do not preclude the presence or addition of one or more other features, integers, steps, operations, elements, components, and/or groups thereof. Certain examples and elements described in the present specification, including in the claims and as illustrated in the figures, may be distinguished or otherwise identified from others by unique adjectives (e.g. a "first" element distinguished from another "second" or "third" of a plurality of elements, a "primary" distinguished from a "secondary" one or "another" item, etc.) Such identifying adjectives are generally used to reduce confusion or uncertainty, and are not to be construed to limit the claims to any specific illustrated element or embodiment, or to imply any precedence, ordering or ranking of any claim elements, limitations or process steps.

The descriptions of the various embodiments of the present invention have been presented for purposes of illustration, but are not intended to be exhaustive or limited to the embodiments disclosed. Many modifications and variations will be apparent to those of ordinary skill in the art without departing from the scope and spirit of the described embodiments. The terminology used herein was chosen to best explain the principles of the embodiments, the practical application or technical improvement over technologies found in the marketplace, or to enable others of ordinary skill in the art to understand the embodiments disclosed herein.

What is claimed is:

1. A computer-implemented method, comprising executing on a computer processor:
   identifying each of a plurality of different individual graphic elements displayed within a web page layout that are selected from the group consisting of text characters, images and graphical control elements, wherein the graphical control elements are selected from the group consisting of radio buttons, checkboxes, drop down menu initialization scripts, widgets, and controls;

linearly grouping the identified graphic elements as a function of differences in each identified graphic element positioning relative to others of the identified graphic elements, wherein the linear groupings are selected from the group consisting of horizontal rows and vertical columns;

identifying clusters of the linear groupings and the individual graphic elements as a function of clustering indicia selected from the group consisting of layout pattern indicia, gap level indicia and cluster group indicia;

identifying each of a plurality of repetitive groupings of the clusters as unique list region collections;

determining a tree structure for the unique list region collections that identifies ones of unique list region collections having more dominant identified element attribute values within the web page layout as root nodes, and other ones of the unique list region collections having less dominant identified element attribute values within the web page layout as child nodes relative to the root nodes, wherein the attribute values are selected from the group consisting of element type, element size, element alignment, element style and element class name;

identifying a plurality of individual words that are each formed from text characters of the plurality of the different individual graphic elements displayed within the web page layout as sentence candidates as a function of determining that the individual words are aligned relative to each other in a common one of the linear groupings;

excluding ones of the words from the sentence candidate plurality of words in response to determining that the excluded words are spaced by at least a sentence separation threshold gap distance to another of the sentence candidate plurality of words, thereby generating a remainder plurality of sentence candidate words; and validating a sequential grouping of the remainder plurality of sentence candidate words as a sentence group via a sentence analysis that is selected from the group consisting of semantic analysis and syntactic analysis.

2. The method of claim 1, further comprising:

integrating computer-readable program code into a computer system comprising a processor, a computer readable memory in circuit communication with the processor, and a computer readable storage medium in circuit communication with the processor; and wherein the processor executes program code instructions stored on the computer-readable storage medium via the computer readable memory and thereby performs the identifying each of the individual graphic elements displayed within the web page layout, the linear grouping of the identified graphic elements, the identifying the clusters of the linear groupings and the individual graphic elements, the identifying each of the repetitive groupings of the clusters as the unique list region collections, and the determining the tree structure for the unique list region collections.

3. The method of claim 2, wherein the computer-readable program code is provided as a service in a cloud environment.

4. The method of claim 1, wherein the linear grouping is selected from the group consisting of:

determining a first horizontal sentence row which groups together into the first horizontal sentence row a first plurality of individual graphic element text words spaced vertically from a second horizontal sentence row which groups together a second plurality of individual graphic element text words; and identifying a third plurality of individual graphic element text words that are each located within a threshold proximity to each other and to a third graphical control element as descriptive text associated with the third graphical control element, as distinguished from another graphic element text word that is not within the threshold proximity to the third plurality of individual graphic element text words or to the third graphical control element.

5. The method of claim 1, further comprising:

transforming validated sentence group of words in the linear groupings into pixel point data;

aggregating the pixel point data into regional groupings of point data via a clustering process that is selected from the group consisting of k-means clustering and k-nearest neighbors clustering; and identifying the repetitive groups as the unique list region collections as a function of comparing structured image pixel data of neighboring ones of the point data aggregation clusters.

6. The method of claim 1, further comprising:

generating mark-up language representations of the identified graphic elements of each tree structure node; and in response to matching a mark-up language representation of an initial version of a revised image of the web page to the mark-up language representation generated for a first of the tree structure nodes, updating the mark-up language representation generated for the first of the tree structure nodes with a mark-up language representation of the revised image.

7. The method of claim 6, further comprising:

in response to determining that the mark-up language representation of the initial version of the revised image does not match any of the mark-up language representations generated for the tree structure nodes, generating a new node within the unique list region collection aggregation cluster tree to represent the revised image element.

8. A system, comprising:

a processor;

a computer readable memory in circuit communication with the processor; and a computer readable storage medium in circuit communication with the processor;

wherein the processor executes program instructions stored on the computer-readable storage medium via the computer readable memory and thereby:

identifies each of a plurality of different individual graphic elements displayed within a web page layout that are selected from the group consisting of text characters, images and graphical control elements, wherein the graphical control elements are selected from the group consisting of radio buttons, checkboxes, drop down menu initialization scripts, widgets, and controls;

linearly grouping the identified graphic elements as a function of differences in each identified graphic element positioning relative to others of the identified graphic elements, wherein the linear groupings are selected from the group consisting of horizontal rows and vertical columns;

identifies clusters of the linear groupings and the individual graphic elements as a function of clustering indicia selected from the group consisting of layout pattern indicia, gap level indicia and cluster group indicia;

identifies each of a plurality of repetitive groupings of the clusters as unique list region collections;

determines a tree structure for the unique list region collections that identifies ones of unique list region collections having more dominant identified element attribute values within the web page layout as root nodes, and other ones of the unique list region collections having less dominant identified element attribute values within the web page layout as child nodes relative to the root nodes, wherein the attribute values are selected from the group consisting of element type, element size, element alignment, element style and element class name;

identifies a plurality of individual words that are each formed from text characters of the plurality of the different individual graphic elements displayed within the web page layout as sentence candidates as a function of determining that the individual words are aligned relative to each other in a common one of the linear groupings;

excludes ones of the words from the sentence candidate plurality of words in response to determining that the excluded words are spaced by at least a sentence separation threshold gap distance to another of the sentence candidate plurality of words, thereby generating a remainder plurality of sentence candidate words; and validates a sequential grouping of the remainder plurality of sentence candidate words as a sentence group via a sentence analysis that is selected from the group consisting of semantic analysis and syntactic analysis.

9. The system of claim 8, wherein the processor executes the program instructions stored on the computer-readable storage medium via the computer readable memory and thereby:

determines a first horizontal sentence row which groups together a first plurality of individual graphic element text words spaced vertically from a second horizontal sentence row which groups together a second plurality of individual graphic element text words; and identifies a third plurality of individual graphic element text words that are each located within a threshold proximity to each other and to a third graphical control element as descriptive text associated with the third graphical control element, as distinguished from another graphic element text word that is not within the threshold proximity to the third plurality of individual graphic element text words or to the third graphical control element.

10. The system of claim 8, wherein the processor executes the program instructions stored on the computer-readable storage medium via the computer readable memory and thereby:

transforms validated sentence group of words in the linear groupings into pixel point data;

aggregates the pixel point data into regional groupings of point data via a clustering process that is selected from the group consisting of k-means clustering and k-nearest neighbors clustering; and identifies the repetitive groups as the unique list region collections as a function of comparing structured image pixel data of neighboring ones of the point data aggregation clusters.

11. The system of claim 8, wherein the processor executes the program instructions stored on the computer-readable storage medium via the computer readable memory and thereby:

generates mark-up language representations of the identified graphic elements of each tree structure node; and in response to matching a mark-up language representation of an initial version of a revised image of the web page to the mark-up language representation generated for a first of the tree structure nodes, updates the mark-up language representation generated for the first of the tree structure nodes with a mark-up language representation of the revised image.

12. A computer program product comprising:

a computer readable storage medium having computer readable program code embodied therewith, wherein the computer readable storage medium is not a transitory signal per se, the computer readable program code comprising instructions for execution by a processor that cause the processor to:

identify each of a plurality of different individual graphic elements displayed within a web page layout that are selected from the group consisting of text characters, images and graphical control elements, wherein the graphical control elements are selected from the group consisting of radio buttons, checkboxes, drop down menu initialization scripts, widgets, and controls;

linearly grouping the identified graphic elements as a function of differences in each identified graphic element positioning relative to others of the identified graphic elements, wherein the linear groupings are selected from the group consisting of horizontal rows and vertical columns;

identify clusters of the linear groupings and the individual graphic elements as a function of clustering indicia selected from the group consisting of layout pattern indicia, gap level indicia and cluster group indicia;

identify each of a plurality of repetitive groupings of the clusters as unique list region collections;

determine a tree structure for the unique list region collections that identifies ones of unique list region collections having more dominant identified element attribute values within the web page layout as root nodes, and other ones of the unique list region collections having less dominant identified element attribute values within the web page layout as child nodes relative to the root nodes, wherein the attribute values are selected from the group consisting of element type, element size, element alignment, element style and element class name;

identify a plurality of individual words that are each formed from text characters of the plurality of the different individual graphic elements displayed within the web page layout as sentence candidates as a function of determining that the individual words are aligned relative to each other in a common one of the linear groupings;

exclude ones of the words from the sentence candidate plurality of words in response to determining that the excluded words are spaced by at least a sentence separation threshold gap distance to another of the sentence candidate plurality of words, thereby generating a remainder plurality of sentence candidate words; and validate a sequential grouping of the remainder plurality of sentence candidate words as a sentence group via a sentence analysis that is selected from the group consisting of semantic analysis and syntactic analysis.

13. The computer program product of claim 12, wherein the computer readable program code instructions for execution by the processor further cause the processor to:
- transform validated sentence group of words in the linear groupings into pixel point data;
- aggregate the pixel point data into regional groupings of point data via a clustering process that is selected from the group consisting of k-means clustering and k-nearest neighbors clustering; and
- identify the repetitive groups as the unique list region collections as a function of comparing structured image pixel data of neighboring ones of the point data aggregation clusters.

14. The computer program product of claim 12, wherein the computer readable program code instructions for execution by the processor further cause the processor to:
- generate mark-up language representations of the identified graphic elements of each tree structure node; and
- in response to matching a mark-up language representation of an initial version of a revised image of the web page to the mark-up language representation generated for a first of the tree structure nodes, update the mark-up language representation generated for the first of the tree structure nodes with a mark-up language representation of the revised image.

\* \* \* \* \*